United States Patent [19]
Mochida et al.
[11] Patent Number: 4,477,806
[45] Date of Patent: Oct. 16, 1984

[54] MISCHIEF PREVENTIVE ELECTRONIC LOCK DEVICE

[75] Inventors: Haruo Mochida, Yokohama; Keiichi Shimizu, Tokyo; Hirotoshi Namazue, Yokohama, all of Japan

[73] Assignees: Nissan Motor Company, Limited, Kanagawa; Kokusan Kinzoku Kogyo Co. Ltd., Tokyo, both of Japan

[21] Appl. No.: 428,236

[22] Filed: Sep. 29, 1982

[30] Foreign Application Priority Data

Oct. 2, 1981 [JP] Japan ................................ 56-156098

[51] Int. Cl.$^3$ ........................ H04Q 9/00; E05B 49/00

[52] U.S. Cl. .......................... 340/825.32; 340/825.56; 361/171

[58] Field of Search ...................... 340/825.31, 825.32, 340/825.56; 361/171

[56] References Cited

U.S. PATENT DOCUMENTS

| | | | |
|---|---|---|---|
| 3,320,490 | 5/1967 | Beck et al. | 317/134 |
| 3,587,051 | 6/1971 | Hovey | 340/825.32 |
| 3,593,816 | 7/1971 | Kazaoka | 180/113 |
| 3,633,167 | 1/1972 | Hedin | 340/825.32 |
| 3,641,396 | 2/1972 | Kossen et al. | 317/134 |
| 3,691,396 | 9/1972 | Hinrichs | 307/40 |
| 3,710,316 | 1/1973 | Kromer | 340/63 |
| 3,751,718 | 8/1973 | Honchett, Jr. | 317/134 |
| 3,754,164 | 8/1973 | Zorzy | 317/134 |
| 3,754,213 | 8/1973 | Morroni et al. | 340/825.32 |
| 3,764,859 | 10/1973 | Wood | 317/134 |
| 3,812,403 | 5/1974 | Gartner | 340/825.31 |
| 3,831,065 | 8/1974 | Martin | 317/134 |
| 3,871,474 | 3/1975 | Tomlinson et al. | 180/112 |
| 3,878,511 | 4/1975 | Wagner | 340/825.31 |
| 3,885,408 | 5/1975 | Clark, Jr. | 70/278 |
| 3,893,073 | 7/1975 | Angello | 340/147 |
| 3,953,769 | 4/1976 | Sopko | 317/134 |
| 4,142,097 | 2/1979 | Ulch | 340/825.31 |
| 4,189,712 | 2/1980 | Lemelson | 340/149 |
| 4,197,524 | 4/1980 | Salem | 340/147 MD |
| 4,205,325 | 5/1980 | Haygood et al. | 340/147 |
| 4,206,491 | 6/1980 | Ligman | 361/172 |
| 4,249,245 | 2/1981 | Nakanashi | 364/710 |

FOREIGN PATENT DOCUMENTS

| | | |
|---|---|---|
| 2224629 | 10/1974 | France . |
| 1482628 | 8/1977 | United Kingdom . |

*Primary Examiner*—Donald J. Yusko
*Attorney, Agent, or Firm*—Lowe, King, Price and Becker

[57] ABSTRACT

A mischief preventive electronic lock device has a mischief prevention system which prevents lock/unlock operation for a given period of time after a pushbutton input unit has been operated extraordinarily often in comparison with usual number of keystrokes required for entry of an input code. The electronic lock device is normally operated to lock/unlock a door matching by the input code with a preset code. The mischief prevention system is adapted to count the number of keystrokes from the input unit to perform the foregoing preventive operation whenever the keystroke count exceeds a predetermined value. The mischief prevention system permits further input after expiration of the given period. This discourages trial-and-error attempts to satisfactorily protect the electronic lock device from mischief.

18 Claims, 1 Drawing Figure

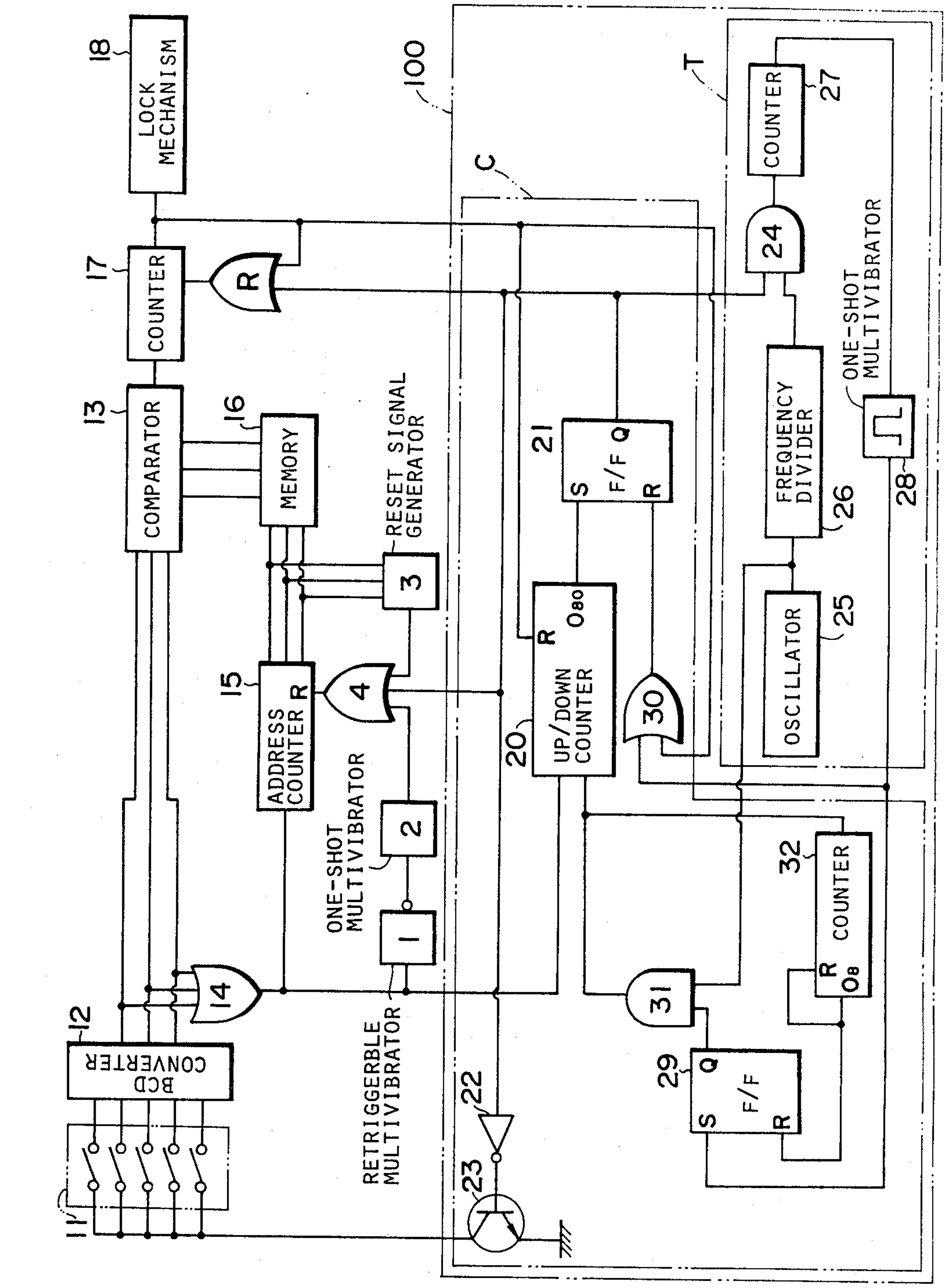
LOCK MECHANISM
COUNTER
COMPARATOR
MEMORY
RESET SIGNAL GENERATOR
ADDRESS COUNTER
ONE-SHOT MULTIVIBRATOR
RETRIGGERBLE MULTIVIBRATOR
BCD CONVERTER
UP/DOWN COUNTER
F/F
FREQUENCY DIVIDER
OSCILLATOR
ONE-SHOT MULTIVIBRATOR
COUNTER

MISCHIEF PREVENTIVE ELECTRONIC LOCK DEVICE

BACKGROUND OF THE INVENTION

The present invention relates generally to an electronic lock device for locking and unlocking a door by way of a preset code entered via a keyboard with a plurality of push buttons. More particularly, the invention relates to a mischief prevention device in the push-button electronic lock device.

In such an electronic lock device, the preset code consists of an encoded sequence of digits, each of which can be entered by depressing a corresponding push button. Such a system can possibly be accidentally and unnecessarily operated to lock or unlock the door by depressing the push buttons at random. This possibility can be reduced by using a rather long preset code since this makes it difficult to enter all of the encoded digits in the correct order. On the other hand, a long sequence of digits is difficult for the user to remember. Alternatively, it is also possible to reduce the possibility of such mischief by providing a relatively large number of push buttons to increase the number of code sequence combinations. However, this makes the lock device more expensive.

SUMMARY OF THE INVENTION

Therefore, it is an object of the present invention to provide a mischief preventive electronic lock device which can prevent code input if the push buttons are operated more often than a predetermined limit.

According to the present invention, there is provided an electronic lock device with a cancel circuit. The cancel circuit is adapted to count the occurrences of entry of code digits and to inhibit the lock device from responding to the inputted code for a given period when the entry count exceeds a predetermined value.

In the preferred embodiment, the electronic lock device comprises a lock mechanism, a push-button input unit for code digit input, a memory for storing a preset code to be read out in response to digit input, a comparator for comparing the input code with said preset code to produce a drive signal for actuating the lock mechanism into a locking or unlocking position when the input code and the preset code match and a mischief prevention system which comprises a counter for counting the occurrences of input from the input unit and producing a counter signal which disables the electronic lock device for a predetermined period of time after the number of occurrences reaches a predetermined value.

BRIEF DESCRIPTION OF THE DRAWINGS

The present invention will be understood from the detailed description given herebelow and from the accompanying drawing which is a circuit diagram of the preferred embodiment of the mischief preventive electronic lock device according to the invention, which, however, should not be taken as limitative to the invention but for elucidation and explanation only.

DESCRIPTION OF THE PREFERRED EMBODIMENTS

Referring now to the drawing, an input unit 11 comprises a push button keyboard with a plurality of push buttons which produce input signals when depressed. The input signals of the different push buttons differ so that each input signal represents a specific and unique digit. An input code is entered by depressing the push buttons in the order of the sequence of the encoded digits.

The input signal is converted into binary code in a BCD converter 12. The output of the BCD converter 12 is fed to an address counter 15 via an OR gate 14. The address counter 15 counts signals from the OR gate 14 to produce an address signal in order to access a corresponding memory address of a memory circuit 16 which stores a preset code to be compared with the input code. Since the address signals increase sequentially, the memory circuit 16 is also sequentially accessed to output the corresponding digits. The contents of the accessed memory address are sent to a digital comparator 13.

At the same time, the output of the BCD converter 12 representative of the inputted code digit is fed to the comparator 13. The comparator 13 compares the input digit and the preset digit to produce a comparator signal each time the compared code digits match. A counter 17 counts the comparator signals and produces a drive signal when the counter value reaches a preset value. The drive signal is conducted to a lock mechanism 18 to actuate the latter to the locking or unlocking state.

The gate signal of the OR gate 14 leads to a retriggerable multivibrator 1, the output of which is fed to a one-shot multivibrator 2. The one-shot multivibrator 2 is adapted to be triggered by the rising edge of a HIGH-level signal to produce a trigger signal.

The given period for which the retriggerable multivibrator 1 remains LOW defines an allowable interval of entry of another code element from the input unit. Therefore, as long as digits are entered sequentially within an interval shorter than the given period, the output level of the retriggerable multivibrator 1 remains LOW.

The trigger signal from the one-shot multivibrator 2 is fed to the reset terminal of the address counter 4 via an OR gate 4. The address counter 15 is responsive to any signal from the OR gate 4 to be reset to its initial value. On the other hand, a reset signal generator 3 is also connected to the reset terminal of the address counter 15 via the OR gate 4. The reset signal generator 3 is, in turn, connected to the output terminal of the address counter 15 to receive the address signal. The reset signal generator 3 counts the address signals to produce a reset signal when the counter value reaches a predetermined value in order to reset the address counter.

The output of OR gate 14 is connected to the upinput terminal of an up/down counter 20 of a cancel circuit C. The up/down counter 20 has a reset input terminal R which is connected to the output of the counter 17 to be reset by the drive signal. The up/down counter 20 is adapted to produce a counter signal when the counter value reaches a predetermined value which is representative of a predetermined maximum number of strokes of the push buttons in the input unit 11. The counter signal of the up/down counter 20 is fed to a set input terminal S of a flip-flop 21. In the set position, the flip-flop 21 produces a set signal which serves as a disabling signal for the counter 17 and the input unit 11. The disabling signal is fed to the counter 17 to disable the counter operation. At the same time, the disabling signal is also fed to the base electrode of a transistor 23 via an inverter 22. In response to the inverter signal inverting the disabling signal, the transistor 23 is cut-off. The transistor 23 is interposed between the input unit 11 and ground so that the input unit 11 is de-activated in order to inhibit entry of the input code in response to the disabling signal.

The disabling signal of the flip-flop 21 is also fed to one of the input terminals of an AND gate 24. The other input terminal of the AND gate is connected to an oscillator 25 via a frequency divider 26 to receive therefrom a clock signal. In the presence of both the disabling signal and the clock signal, the AND gate 24 outputs a gate signal to a counter 27. Thus, as along as the disabling signal is present, the counter 27 counts the clock signal to measure time. When the counter value reaches a preset value, which corresponds to a predetermined disabled time of the input unit, the counter 27 produces a counter signal. The counter signal is fed to a one-shot multivibrator 28 to trigger the latter. The one-shot multivibrator 28 outputs a trigger signal to an OR gate 30 which is, in turn, connected to the reset input terminal of the flip-flop 21. The other input terminal of the OR gate 30 is connected to the counter 17 to receive the drive signal. Therefore, the flip-flop 21 is reset either when the preset time in the counter 27 expires or when the drive signal is produced, in order to resume operation of the input unit 11 and the counter 17.

At the same time, the trigger signal of the one-shot multivibrator 28 is fed to the set input terminal of a flip-flop 29 to set the latter. In the set position, the flip-flop 29 feeds a flip-flop signal to an AND gate 31. To the other input terminal of the AND gate 31, the oscillator 25 is connected. Therefore, the AND gate 31 outputs a gate signal in response to the oscillator signal in the presence of the flip-flop signal. The output of the AND gate is fed to the down-count input terminal of the up/down counter 20 to decrement the counter value. This output is also fed to a counter 32 which is adapted to produce a counter signal when the counter value reaches a predetermined value, e.g. 8. In response to the counter signal, the counter 32 and the flip-flop 29 are reset.

In this case, the input unit 11 accepts 8 key strokes of entry of the input code. If the inputted code matches the preset code, the up/down counter 20 is reset by the drive signal to initialize the counter position. At this time, the drive signal resets the flip-flop 21. On the other hand, if the input code does not match the preset code, the cancel circuit repeats the foregoing operation to disable entry of input code for the given period.

Therefore, according to the present invention, mischief via the input unit can be satisfactorily prevented by discouraging entry of input code on a trial-and-error basis for the purpose of theft or mischief.

While the present invention has been described in terms of the specific embodiment, the invention can be embodied otherwise and be modified in many way without departing from the principle of the invention.

What is claimed is:

1. In an electric lock device including a lock mechanism, a push-button input unit for entry of an input code, a memory for storing a preset code which can be read out in response to input of said input code, a comparator for comparing said input code with said preset code to produce a drive signal for actuating said lock mechanism to either of a locking and an unlocking position when said input code and said preset code match, a mischief preventive system comprising:

a counter for counting occurrences of all input push-button keystrokes via said input unit and producing a counter signal when the number of said occurrences reaches a predetermined value, and disabling means, associated with said input unit and responsive to said counter signal, for disabling said input unit to disable further input occurrences therefrom for a predetermined period of time, said disabling means operable after expiration of said predetermined period of time for permitting a given number of occurrences of input via said input unit after said input unit is once disabled.

2. In an electronic lock device including a lock mechanism a push-button input unit having a plurality of push buttons for entry of an input code, a memory for storing a preset code which can be read out in response to input of said input code, a comparator for comparing said input code and said preset code to produce a drive signal for actuating said lock mechanism to either of a locking and unlocking position when said input code and said preset code match, a mischief prevention system comprising:

a counter for counting the occurrences of input via said input unit to produce a counter signal when the number of said occurrences reaches a first predetermined value;

disabling means associated with said input unit and operative in response to said counter signal, for disabling input via said input unit;

enabling means, associated with said disabling means and operative when said predetermined period of time expires, for deactivating said disabling means and for reversing the effect of said counter to cause counting down of said counter by a second predetermined value and thus to allow said second predetermined value of input when said disabling means is deactivated.

3. In an electronic lock device including a lock mechanism, a push-button input unit having a plurality of push buttons for entry of an input code, a memory for storing a preset code which can be read out in response to input of said input code, and a comparator for comparing said input code and said preset code to produce a drive signal to actuate said lock mechanism to either of a locking and an unlocking position when said input code and said preset code match, a mischief prevention system comprising:

a counter for counting the keystrokes from said input unit during entry of said input code and producing a counter signal when said counter value reaches a first predetermined value so as to inhibit entry of input;

disabling means, associated with said input unit and operative in response to said counter signal, for disabling said input unit for inhibiting entry of input for a given time period;

timer means, associated with said disabling means and operative in response to said counter signal to measure a predetermined time period in which said input unit is disabled, said timer means producing a timer signal when said given period of time expires; and enabling means, associated with said counter and operative in response to said timer signal, for causing said counter to count down a given number in order to permit input of that number of keystrokes from said input unit after expiration of said predetermined period of time.

4. In an electronic lock device including a lock mechanism, a push-button input unit having a plurality of push buttons for entry of an input code, and an operation means for producing a drive signal which actuates said lock mechanism to either of a lock and an unlock position when the input code matches a preset code, a mischief prevention system comprising:

a counter for counting the number of keystrokes of said pushbuttons during entry of said input code to produce a counter signal whenever the counter value exceeds a first predetermined value;

first disabling means, associated with said operation means and operative in response to said counter signal, for disabling said operation means for a given period of time;

second disabling means, associated with said input unit and operative in response to said counter signal, for disabling entry of said input code for a given period of time;

a timer means, operative in response to said counter signal for producing a timer signal when said given period of time expires;

first enabling means, associated with said first disabling means and operative in response to said timer signal to deactivate said disabling means and thereby resuming operation of said operation means; and second enabling means, associated with said counter and operative in response to said timer signal, for causing said counter to count down a given value so as to permit entry of the given number of keystrokes from said input unit, after expiration of said given period of time.

5. The system as set forth in any one of claims 1 to 4, wherein said counter is responsive to said drive signal to reset the counter value thereof.

6. The system as set forth in any one of claims 1 to 4, wherein said counter is responsive to said drive signal to be initialized.

7. The system as set forth in claim 3 or 4, wherein said given number of keystrokes approximately corresponds to the number of digits of said preset code.

8. In an electronic lock device including a push-button input unit having a plurality of push buttons for entry of an input code, and an operation means for producing a driver signal to operate said lock mechanism when an input code matches a preset code, a method for preventing the device from being continuously operated randomly comprising the steps of:

detecting the occurrences of key-strokes from said input unit for entry of said input code;

counting said occurrences;

comparing the count value of said occurrences with a predetermined threshold;

disabling said operation means for a given period of time whenever said count value exceeds said predetermined threshold; and resuming operation of said operation means after said given period of time expires, for permitting entry of a given number of input key-strokes.

9. In an electronic lock device including a push-button unit having a plurality of push buttons for entry of an input code, and an operation means for producing a driver signal to operate said lock mechanism when an input code matches a preset code, a method for preventing the device from being continuously operated randomly comprising the steps of:

detecting key-strokes from said input unit;

counting the key-strokes;

comparing the number of key-strokes with a predetermined threshold;

disabling said operation means for a given period of time whenever said number of key-strokes exceeds said predetermined threshold to inhibit entry of further input; and reducing the counted value of key-strokes by a given number to allow input of said reduced given number of key-strokes from said input unit, after expiration of said given period of time.

10. The method as set forth in claim 8 or 9, which further includes the step of resetting said count value in response to said drive signal.

11. The method as set forth in claim 10, which further includes the step of reducing said count value by a given value to cease disabling of said operation means.

12. A mischief preventive keyless entry system for an automotive vehicle for locking and unlocking a door lock in use with a preset code, comprising:

a lock mechanism operable in locking and unlocking positions for locking and unlocking the vehicle door;

an input unit including a plurality of push-buttons for entry of an input code in a predetermined number of key-strokes corresponding to said preset code;

a drive signal generator means for comparing said input code and said preset code for producing a drive signal when said input and preset code match;

an actuator incorporated with said lock mechanism and operative in response to said drive signal, for operating said lock mechanism into said locking or unlocking position;

a counter for counting key-strokes of said input unit and comparing the counter value with a predetermined value to produce a counter signal when the counter value reaches said predetermined value;

first disabling means, interposed between said drive signal generator and said actuator for breaking electric communication therebetween in response to said counter signal;

second disabling means, associated with said input unit and operative in response to said counter signal, for disabling said input unit to inhibit entry of said input code for a given period of time;

enabling means associated with said first and second disabling means for deactivating both of said first and second disabling means after expiration of said given period of time for resuming system operation and allowing entry of a given number of key-strokes of said input code.

13. The system as set forth in claim 12, which further comprises timer means, responsive to said counter signal, to measure said given period of time to produce a timer signal as said given period of time expires to activate said enabling means.

14. The system as set forth in claim 12 or 13, wherein said given number of strokes allowed to enter after expiration of said given period of time substantially corresponds to a number of key-strokes for entry of said preset code.

15. The system as set forth in claim 12 or 13, wherein said enabling means is associated with said counter for causing counting down operation when said given period of time expires until the counted down value reaches said given number of key-strokes.

16. In an electric lock device including a lock mechanism, a push-button input unit for entry of an input code, a memory for storing a preset code which can be read out in response to input of said input code, a comparator for comparing said input code with said preset code to produce a drive signal for actuating said lock mechanism to either of a locking and an unlocking position when said input code and said preset code match, a mischief preventive system comprising:

a counter for counting occurrences of input via said input unit and producing a counter signal when the number of said occurrences reaches a predetermined value corresponding to a first given number of permitted keystrokes, and disabling means, associated with said input unit and responsive to said counter signal, for disabling said input unit to disable further input occurrences therefrom for a predetermined period of time, said disabling means operable after expiration of said predetermined period of time for ending disabling of said input unit and for permitting input of a second given number of input keystrokes via said input unit, which second given number of keystrokes is less than said first given number of keystrokes.

17. In an electronic lock device including a lock mechanism, a push-button input unit having a plurality of push buttons for entry of an input code, a memory for storing a preset code which can be read out in response to input of said input code, and a comparator for comparing said input code and said preset code to produce a drive signal to actuate said lock mechanism to either of a locking and an unlocking position when said input code and said preset code match, a mischief preevention system comprising:

a counter for counting the keystrokes from said input unit during entry of said input code and producing a counter signal when said counter value reaches a first predetermined value corresponding to a first number of keystrokes so as to inhibit entry of input;

disabling means, associated with said input unit and operative in response to said counter signal, for disabing said input unit for inhibiting entry of input for a given time period;

timer means, associated with said disabling means and operative in response to said counter signal to measure a predetermined time period in which said input unit is disabled, said timer means producing a timer signal when said given period of time expires; and enabling means, associated with said counter and operative in response to said timer signal, for causing said counter to count down a given number in order to permit input of a second given acceptable number of keystrokes from said input unit after expiration of said predetermined period of time, which second given acceptable number of keystrokes is substantially less than said first given acceptable number of keystrokes.

18. In an electric lock device including a lock mechanism, a push-button input unit for entry of an input code, a memory for storing a preset code which can be read out in response to input of said input code, a comparator for comparing said input code with said preset code to produce a drive signal for actuating said lock mechanism to either of a locking and an unlocking position when said input code and said preset code match, a mischief preventive system comprising:

a counter for counting occurrences of input via said input unit and producing a counter signal when the number of said occurrences reaches a predetermined value corresponding to a first predetermined number of permitted keystrokes; and disabling means, associated with said input unit and responsive to said counter, for disabling said input unit to disable further input occurrences therefrom for a predetermined period of time, said disabling means operable after expiration of said predetermined period of time for decreasing said first predetermined number of permitted keystrokes by a given value to allow entry of a second predetermined number of keystrokes of input code.

* * * * *